(12) United States Patent  
Anthonisamy et al.

(10) Patent No.: US 8,805,978 B1  
(45) Date of Patent: Aug. 12, 2014

(54) DISTRIBUTED CLUSTER RECONFIGURATION

(75) Inventors: Frederick Bosco Anthonisamy, Sunnyvale, CA (US); Suhas Dantkale, Sunnyvale, CA (US); Amarinder Singh Randhawa, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 179 days.

(21) Appl. No.: 13/407,626

(22) Filed: Feb. 28, 2012

(51) Int. Cl.
*G06F 15/177* (2006.01)

(52) U.S. Cl.
USPC ............................ 709/221; 709/220; 709/208

(58) Field of Classification Search
USPC .................................. 709/208, 212, 220, 221
See application file for complete search history.

(56) References Cited

U.S. PATENT DOCUMENTS 6,748,429 B1 * 6/2004 Talluri et al. .................. 709/221
2006/0053216 A1 * 3/2006 Deokar et al. ................ 709/223

* cited by examiner

*Primary Examiner* — Larry Donaghue
*Assistant Examiner* — Marshall McLoud
(74) *Attorney, Agent, or Firm* — Brill Law Office; Jeffrey Brill

(57) ABSTRACT

A reconfiguration is distributed among multiple nodes of a cluster. Upon detecting an initiation of a reconfiguration of the cluster, reconfiguration functionality is delegated from the master node to one or more slave nodes in the cluster. Thus, multiple nodes perform reconfiguration functionality in parallel, such that one or more slave nodes perform delegated reconfiguration tasks that would conventionally be performed by the master node. The cluster reconfiguration can be in the form of one or more nodes joining or leaving the cluster. Data to facilitate the cluster reconfiguration can be transmitted from the master node to a slave node to which reconfiguration functionality is being delegated. Such data can include, for example, identifiers of nodes joining or leaving the cluster and/or information concerning the architecture and shared storage media of the cluster.

20 Claims, 4 Drawing Sheets

DISTRIBUTED CLUSTER RECONFIGURATION

TECHNICAL FIELD

This disclosure pertains generally to computer cluster management, and more specifically to distributing cluster reconfiguration among multiple nodes.

BACKGROUND

In cloud-based computing environments, computing resources such as processing power, storage and software applications are provided as services to users over a network (e.g., the internet). In cloud computing, the use of virtual machines is common to isolate specific computing resources within the cloud for specific users (e.g., different organizations or enterprises that are receiving computing services from the cloud). For example, running a plurality of virtual machines on one or more underlying physical computers lends itself well to partitioning computing resources to different organizational users over the cloud, while keeping the resources of the different users separate, private and secure.

In a private cloud, a set of computing resources is operated for a single organizational user, and made available to that organization over a network. Virtual machines are commonly used in private cloud environments too. For example, because virtual machines can be suspended and restarted on different hosts, the use of virtual machines in a private cloud provides mobility.

In order to provide an application with high availability in a cloud environment (private or otherwise), the application can be run on a virtual machine which is in turn running on a high-availability cluster. High-availability clusters (also known as HA clusters or failover clusters) are groups of computers (nodes) that support running server applications with a minimum of down-time. A high-availability cluster uses groups of redundant computing resources in order to provide continued service when individual system components fail. More specifically, high-availability clusters eliminate single points of failure by providing multiple servers, multiple network connections, redundant data storage, etc.

In computer storage, logical volume management is a flexible method of allocating space on mass-storage devices. In particular, a volume manager can concatenate, stripe together or otherwise combine underlying physical partitions into larger, virtual ones. An administrator can then re-size or move logical volumes, potentially without interrupting system use.

A cluster volume manager extends volume management across the multiple nodes of a cluster, such that each node recognizes the same logical volume layout, and the same state of all volume resources at all nodes. Under cluster volume management, any changes made to volume configuration from any node in the cluster are recognized by all the nodes of the cluster.

In order to support cluster level volume management, the cluster is reconfigured when new nodes join the cluster, and when existing nodes leave the cluster. Conventionally, cluster reconfiguration is driven by a single (master) node in the cluster. Typically, volume management transactions and disk I/O are blocked momentarily during cluster reconfiguration. Such delay is highly undesirable. As mission critical applications are increasingly being moved to cloud based environments, customers want to be able to start such applications as quickly as possible when their hosts are brought up in the cloud (as nodes in a cluster). Even a short period of datacenter downtime can be extremely expensive, especially in certain industries such as banking, telecommunications and transportation.

It would be desirable to address these issues.

SUMMARY

A reconfiguration is distributed among multiple nodes of a cluster. Upon detecting an initiation of a reconfiguration of the cluster, reconfiguration functionality is delegated from the master node to one or more slave nodes in the cluster. Thus, multiple nodes in the cluster perform reconfiguration functionality in parallel, such that one or more slave nodes perform delegated reconfiguration tasks that would conventionally be performed by the master node.

The cluster reconfiguration can be in the form of one or more nodes joining or leaving the cluster. Bringing up a cluster is a special case of join, in which all nodes join the cluster. Where a slave node to which reconfiguration functionality is being delegated does not have a current version of data to facilitate the cluster reconfiguration, the current data can be transmitted from the master node to the slave node. Such data can include, for example, identifiers of nodes joining or leaving the cluster and/or information concerning the architecture and shared storage media of the cluster.

It can be determined which slave nodes to delegate reconfiguration functionality to based on various factors. In one embodiment, delegation can be based physical proximity between the slave node(s) and the node(s) joining or leaving the cluster as part of the reconfiguration. Thus, reconfiguration functionality can be delegated to a slave node located within the same physical site as a node joining or leaving the cluster. Similarly, reconfiguration functionality can be delegated to a slave node running as a virtual machine on the same physical host as a node joining or leaving the cluster. Delegation can also or instead be based on factors such as hardware resources available on the slave node, performance history of the slave node, and/or a user directive.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
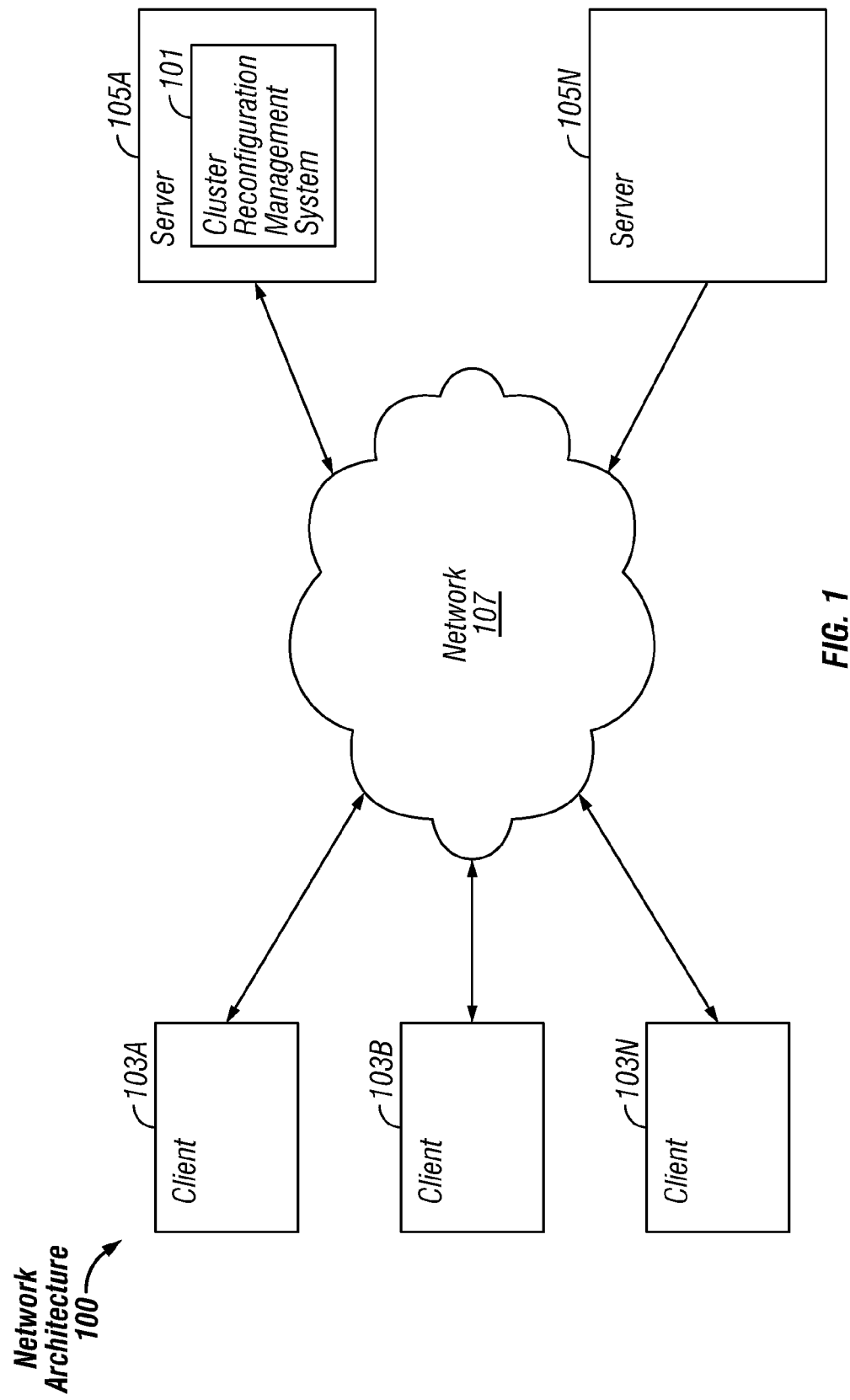
FIG. 1 is a block diagram of an exemplary network architecture in which a cluster reconfiguration management system can be implemented, according to some embodiments.

FIG. 1 is a block diagram illustrating an exemplary network architecture 100 in which a cluster reconfiguration management system 101 can be implemented. The illustrated network architecture 100 comprises multiple clients 103A, 103B and 103N, as well as multiple servers 105A and 105N. In FIG. 1, the cluster reconfiguration management system 101 is illustrated as residing on server 105A. It is to be understood that this is an example only, and in various embodiments various functionalities of this system 101 can be instantiated on a server 105, a client 103, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown).

Although FIG. 1 illustrates three clients and two servers as an example, in practice many more (or fewer) clients 103 and/or servers 105 can be deployed. In one embodiment, the network 107 is in the form of the Internet. Other networks 107 or network-based environments can be used in other embodiments.

Figure 2:
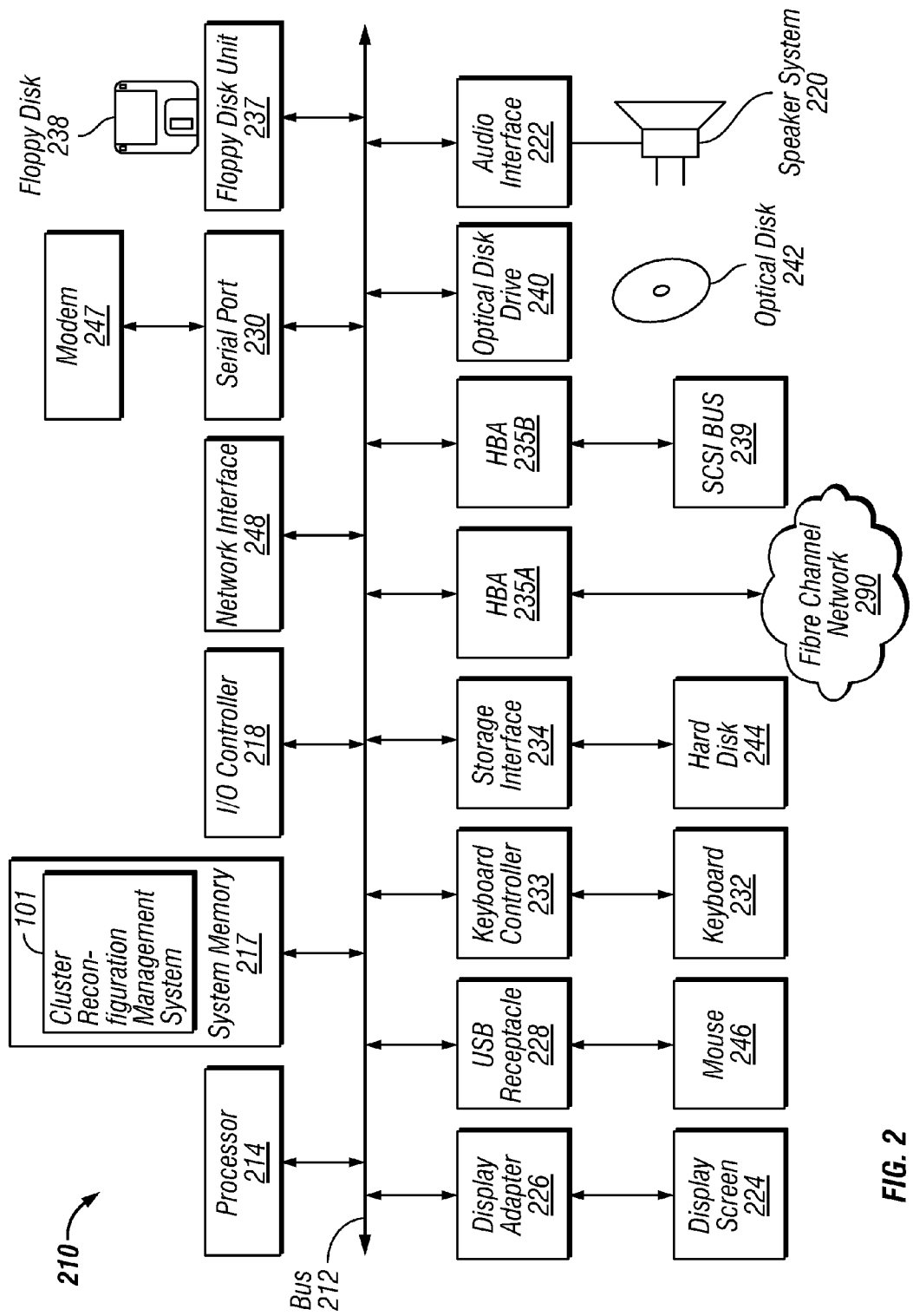
FIG. 2 is a block diagram of a computer system suitable for implementing a cluster reconfiguration management system, according to some embodiments.

FIG. 2 is a block diagram of a computer system 210 suitable for implementing a cluster reconfiguration management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a floppy disk drive 237 configured to receive a floppy disk 238, a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the cluster reconfiguration management system 101 is illustrated as residing in system memory 217. The workings of the cluster reconfiguration management system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
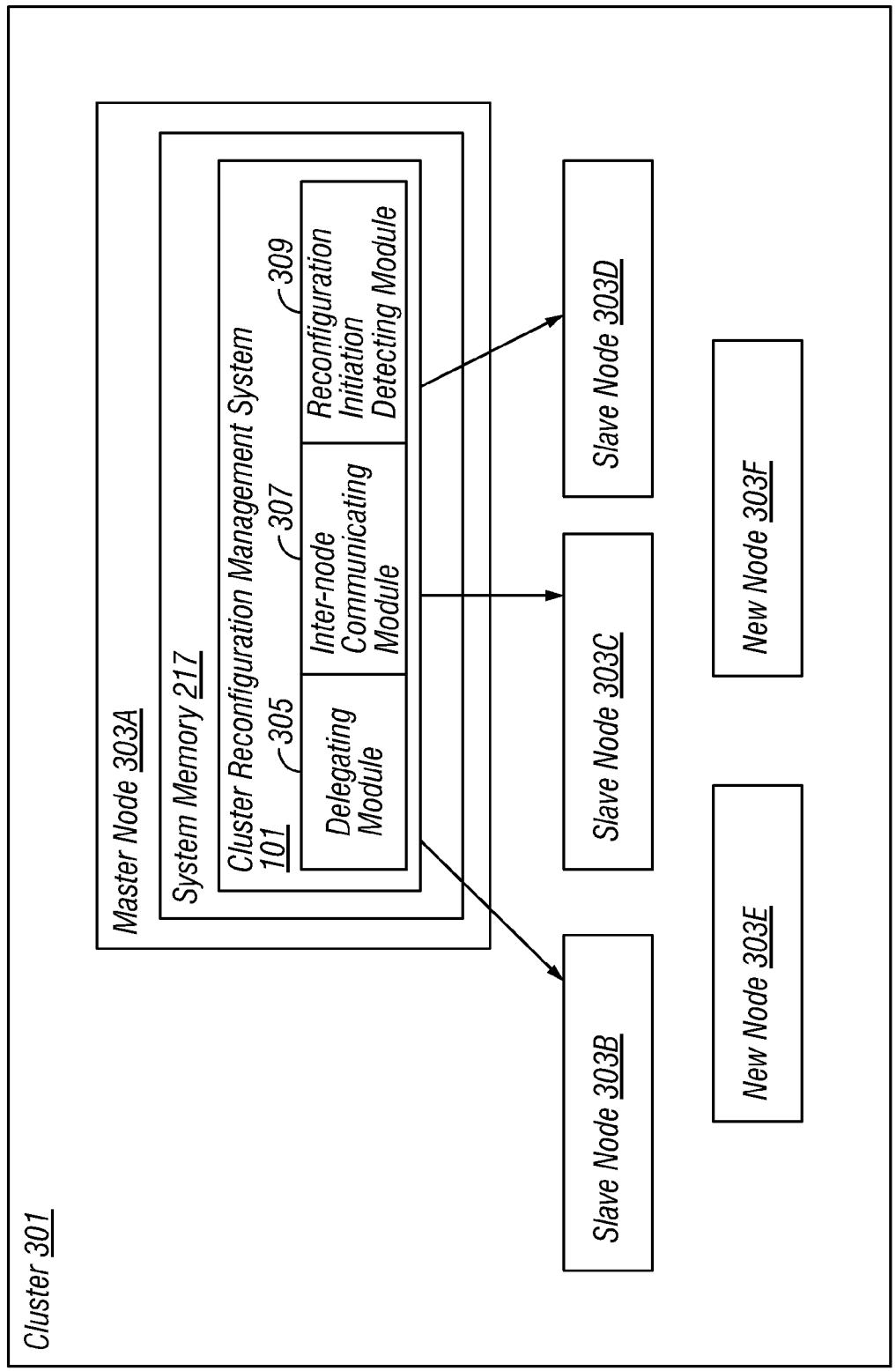
FIG. 3 is a block diagram of the operation of a cluster reconfiguration management system, according to some embodiments.

FIG. 3 illustrates the operation of a cluster reconfiguration management system 101, according to some embodiments. As described above, the functionalities of the cluster reconfiguration management system 101 can reside on a client 103, a server 105, or be distributed between multiple computer systems 210, including within a cloud-based computing environment in which the functionality of the cluster reconfiguration management system 101 is provided as a service over a network 107. It is to be understood that although the cluster reconfiguration management system 101 is illustrated in FIG. 3 as a single entity, the illustrated cluster reconfiguration management system 101 represents a collection of functionalities, which can be instantiated as a single or multiple modules as desired (an instantiation of specific, multiple modules of the cluster reconfiguration management system 101 is illustrated in FIG. 3). For illustration purposes, the cluster reconfiguration management system 101 is depicted as residing in a single node 303 of the illustrated cluster 301 and managing functionality that occurs on different nodes 303. In practice the cluster reconfiguration management system 101 can be distributed across multiple nodes 303 of the cluster 301 as desired. For example, FIG. 3 illustrates a cluster reconfiguration management system 101 comprising a delegating module 305, an inter-node communicating module 307 and a reconfiguration initiation detecting module 309. Typically, each node 303 of the cluster 301 contains inter-node communicating functionality and reconfiguration initiation detecting functionality. In some embodiments, delegating functionality is also distributed between multiple nodes 303 of the cluster 301. These functionalities are discussed in greater detail below.

It is to be understood that the modules of the cluster reconfiguration management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the cluster reconfiguration management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a cluster reconfiguration management system 101 distributes cluster 301 reconfiguration tasks among multiple nodes 303 of the cluster 301. FIG. 3 illustrates a cluster 301 comprising four existing nodes 303A-D. Two new nodes, nodes 303E and 303F, are joining the cluster 301. It is to be understood that in practice clusters 301 can be orders of magnitude larger than the one illustrated in FIG. 3.

Under a conventional system, an existing node, for example node 303A, would process the new nodes 303E, 303F joining the cluster 301 and the associated cluster 301 reconfiguration. In this example, node 303A would function as a master node, and drive the join of each one of the new nodes 303E, 303F in serial. While master node 303A is performing these operations, existing nodes 303B-D, which can be thought of as slaves to master node 303A in this context, sit idle. As used herein, "master node" means an existing node 303 in the cluster 301 which is assigned an initiating role in a cluster reconfiguration, whereas "slave node" means an existing node 303 in the cluster 301 other than the master.

With the cluster reconfiguration management system 101, operations performed during a cluster 301 reconfiguration can be advantageously distributed between the master node 303A and slaves nodes 303B-E. This results in operations being performed in parallel that a conventional system would perform serially. In the illustrated scenario, a master node 303A is first selected during a cluster 301 reconfiguration by using conventional functionality. A reconfiguration initiation detecting module 309 of the cluster reconfiguration management system 101 detects the initiation of the cluster 301 reconfiguration. A delegating module 305 of the cluster reconfiguration management system 101 then delegates reconfiguration functionality to one or more slave nodes 303, so that aspects of the reconfiguration that are conventionally performed in serial can be performed in parallel. Referencing the example configuration in FIG. 3, in which two new nodes 303E and 303F join a cluster 301 of four existing nodes 303A-D, the delegating module 305 could delegate the join of new node 303E to one of the slave nodes (e.g., 303B), and the join of new node 303F to another of the slave nodes (e.g., 303C). In another embodiment, the master node 303A could process the join of one of the new nodes (e.g., node 303E), and the join of the other new node (e.g., node 303F) could be delegated to one of the slave nodes (e.g., node 303D). As discussed in greater detail below, decisions concerning to which specific nodes 303 to delegate reconfiguration tasks can be based on factors such as physical proximity, available bandwidth and user directives.

Under cluster volume management, each node 303 in the cluster 301 typically shares the same view of the architecture and state of the physical and logical storage media, as well as the nodes 303, of the cluster 301. However, in some embodiments, certain administrative data, or other data used to facilitate the join and/or leave procedure, may be present on the master node 303A but not on the slaves nodes 303. In some instances this can be the case because one or more slaves nodes 303 have not been updated to obtain the current version of shared data from the master node 303A. What specific information is present on the master node 303A but on the slaves nodes 303, if any, depends upon the design and configuration of the specific cluster volume manager, as well as the current state of the slave nodes 303, and can vary between different commercial products and embodiments. Examples can include data such as node identifiers and/or status information concerning the nodes 303 attempting to join and/or leave the cluster 301. Where the master node 303A has data to be used during the reconfiguration that is not currently present on one or more slave nodes 303, an inter-node communicating module 307 of the cluster reconfiguration management system 101 can transmit such data from the master to any slaves nodes 303 to which reconfiguration functionality is being delegated.

In different embodiments, the delegating module 305 can use different criteria to decide to which slave nodes 303 to delegate reconfiguration tasks. In one embodiment, physical proximity can be used as a factor. For example, in a cluster 301 spanning multiple physical sites (e.g., a stretch cluster), the delegating module 305 can delegate join (or leave) operations to slave nodes 303 located within the same physical site as that of the joining nodes 303. Similarly, in a virtualized environment in which nodes 303 in the form of virtual machines are running on physical hosts, the delegating module 305 can delegate reconfiguration operations to slaves nodes 303 running on the same host as the joining (or leaving) nodes 303.

Another factor that the delegating module 305 can take into account is the I/O load, CPU load and/or performance history of the slaves nodes 303. In this scenario, the delegating module 305 can delegate reconfiguration tasks to slave nodes 303 which currently have available I/O bandwidth or CPU cycles, and/or with performance histories indicative of being able to efficiently process the reconfiguration operations.

In some embodiments, human input is used to evaluate system resources and configurations. More specifically, an administrator or similar party can direct the delegating module 305 as to which nodes 303 are or are not to be included in the distribution of specific reconfiguration tasks. The administrator can communicate this information through any type of suitable interface, such as a GUI, a command line, a configuration file, etc.

A slave node 303 to which reconfiguration tasks have been delegated performs the delegatable tasks that are conventionally performed by the master node 303A. For example, in the case of a join, the slave node 303 to which the join has been delegated communicates the information to the node 303 being joined that allows it to become part of the cluster 303. This can comprise information concerning the architecture of the cluster's shared physical and logical storage media, as well as the current state thereof (e.g., physical volumes, sub-disks (sometimes called physical extents), logical volumes, plexes (sometimes called logical extents), disk groups (sometimes called volume groups), etc.). A slave node 303 to which a join operation has been delegated uses the inter-node communicating module 307 to communicate such information to the node 303 being joined to the cluster 301. Such information can be communicated by the slave node 303 to the joined node at kernel and user levels. It is to be understood that the specific information communicated to a joined node 303, as well as the specific mechanisms and handshaking for implementing the communication, can vary between embodiments and commercial products.

In some embodiments, a slave node 303 to which a join operation has been delegated can itself delegate a subsequent join operation to the new node 404 it has just joined. This allows the number of joins being performed in parallel to double with each round of joining. For example, a master node 303 joins a first new node 303, then the master 303 and the newly joined node 303 join a second and a third new node 303 in parallel. Next, the master 303 and the three newly joined nodes 303 join four more nodes 303 in parallel, then eight, then sixteen, and so on. A slave node 303 to which a join operation has been delegated can also perform certain housekeeping operations associated with the join, such as updating a database or assigning objects to the joined node 303. As with the communication of information to the joined node 303, the specific housekeeping operations to perform, and the implementation mechanics used to perform them, can vary between embodiments.

It is to be understood that bringing up a new cluster 301 is a special case of join, in which the nodes 303 all join the new cluster 301. This can be in the form of starting-up a new cluster 301 for the first time, or starting-up an existing cluster 301 such that all of the nodes 303 are restarted at the same time. Conventionally, one of the nodes 303 would be appointed master, and would subsequently drive the joins of the remaining nodes 303 in serial. By using the cluster reconfiguration management system 101, once the master has joined a single slave node 303, a join operation can then be delegated to that slave, such that the master and the first slave can each join an additional slave in parallel. Once this is done, the master and three slaves have joined the cluster 301. Join operations can then be delegated to each of the slaves, and so on. Thus, as explained above, using the cluster reconfiguration management system 101 enables the number of nodes 303 that can be joined in parallel to double with each round of join operations. This is particularly useful during the start-up of a cluster 301, which comprises a large number of joins. For example, if a cluster 301 with 1000 nodes 303 is being started-up, in a conventional system the master node 303 would process 999 join operations in serial. Using the cluster reconfiguration management system 101, the master node 303 could join one slave 303, the master 303 and the joined slave 303 could then join two more slaves 303 in parallel, then those nodes 303 could join four slaves 303 in parallel, then eight, sixteen, thirty two and so on, until all of the nodes 303 are joined. Thus, the use of the cluster reconfiguration management system 101 makes bringing up a new cluster far more efficient, by distributing the join operations among the multiple nodes 303.

A node 303 leaving a cluster also causes a reconfiguration, although one that is typically less resource intensive than that associated with a node 303 joining. In some embodiments, leave operations can also be delegated. The exact tasks involved in a leave operation vary between embodiments and commercial products, but can include steps such updating a database to reflect the leave, recovering objects such as storage resources of the node 303 leaving the cluster 301, and ensuring that the node 303 leaving the cluster 301 did not leave the disk in an unsatisfactory state. Conventionally, these tasks are performed by the master node 303, such that where multiple nodes 303 leave the cluster 301 at the same time, the master processes the leaves in serial. The performance of the leave operations can also be made more efficient by the cluster reconfiguration management system 101. Specifically, the delegation module 305 can delegate leave tasks to available slave nodes 303, such that multiple leaves can be handled in parallel.

Cluster reconfiguration can be thought of as a series of tasks. Existing nodes 303 in the cluster 301 other than the master can be capable of performing these tasks. By delegating tasks to other nodes 303, reconfiguration tasks are performed in parallel, resulting in faster reconfigurations. Because reconfiguration makes the cluster momentarily unavailable, improving reconfiguration performance is of great benefit.

Figure 4:
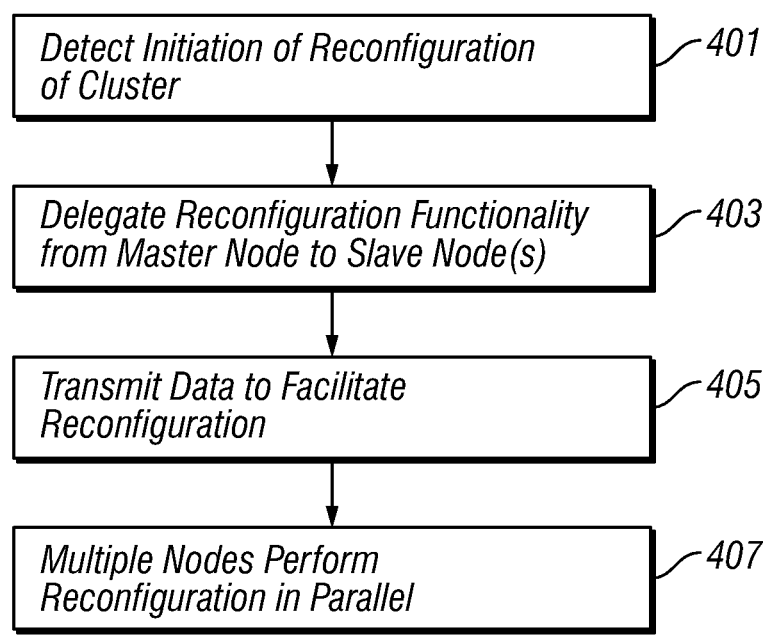
FIG. 4 is a flowchart of the operation of a cluster reconfiguration management system, according to some embodiments.

FIG. 4 illustrates steps of the operation of the cluster reconfiguration management system 101, according to some embodiments. The reconfiguration initiation detecting module 309 detects 401 the initiation of a reconfiguration of the cluster 301. The delegating module 305 delegates 403 reconfiguration functionality from the master node 303 to one or more slave nodes 303. The inter-node communicating module 307 transmits 405 data to facilitate the cluster 301 reconfiguration from the master node 303 to the one or more slave nodes 303 to which reconfiguration tasks are being delegated. (This transmitted data can comprise, for example, identifiers of nodes 303 joining or leaving the cluster 301 as part of the reconfiguration and/or information concerning the architecture and shared storage media of the cluster 301.) Multiple nodes 303 in the cluster 301 perform 407 reconfiguration functionality in parallel, such that at least one slave node 303 performs delegated reconfiguration tasks that would conventionally be performed by the master node 303.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for distributing cluster reconfiguration among multiple nodes of a cluster, the method comprising the steps of:
    detecting an initiation of a reconfiguration of the cluster;
    delegating reconfiguration functionality from a master node in the cluster to at least one slave node in the cluster;
    determining which at least one slave node to delegate reconfiguration functionality to based on at least one factor from a group of factors consisting of: 1) physical proximity between the at least one slave node and at least one node joining or leaving the cluster as part of the reconfiguration, 2) a performance history of the at least one slave node and 3) receiving a directive from a user specifying to which at least one slave node to delegate reconfiguration functionality, and delegating reconfiguration functionality to the at least one slave node specified by the directive from the user; and
    multiple nodes in the cluster performing reconfiguration functionality in parallel;
    wherein the at least one slave node performs delegated reconfiguration tasks that would conventionally be performed by the master node.

2. The method of claim 1 wherein delegating reconfiguration functionality from a master node in the cluster to at least one slave node in the cluster further comprises:
    transmitting data to facilitate the cluster reconfiguration, from the master node to the at least one slave node, the data being present on the master node but not present on the at least one slave node.

3. The method of claim 2 wherein the data to facilitate the cluster reconfiguration present on the master node but not present on the at least one slave node further comprises:

identifiers of at least one node joining or leaving the cluster as part of the reconfiguration.

4. The method of claim 1 further comprising:
delegating reconfiguration functionality to at least one slave node located within a same physical site as at least one node joining or leaving the cluster as part of the reconfiguration.

5. The method of claim 1 further comprising:
delegating reconfiguration functionality to at least one slave node running as a virtual machine on a same physical host as at least one node joining or leaving the cluster as part of the reconfiguration.

6. The method of claim 1 further comprising:
determining which at least one slave node to delegate reconfiguration functionality to based at least in part on available hardware resources of the at least one slave node.

7. The method of claim 1 wherein the reconfiguration of the cluster further comprises:
at least one new node joining the cluster.

8. The method of claim 7 further comprising:
transmitting information from the at least one slave node to the at least one new node joining the cluster concerning the architecture and shared storage media of the cluster.

9. The method of claim 1 wherein the reconfiguration of the cluster further comprises starting-up the cluster, the method further comprising:
appointing one node of the cluster as the master node;
the master node joining a first slave node, and delegating a join of an additional slave node to the first joined slave node;
the master node and the first slave node each joining an additional slave node in parallel, and delegating a join of yet another slave node to each of the additional joined slave nodes; and
cascading the delegation of subsequent join operations to additional joined slave nodes until all of the multiple nodes of the cluster are joined.

10. The method of claim 1 wherein the reconfiguration of the cluster further comprises:
at least one existing node leaving the cluster.

11. At least one non-transitory computer readable medium storing program code that when loaded into computer memory and executed by a processor performs a method comprising the steps of:
detecting an initiation of a reconfiguration of the cluster;
delegating reconfiguration functionality from a master node in the cluster to at least one slave node in the cluster;
determining which at least one slave node to delegate reconfiguration functionality to based on at least one factor from a group of factors consisting of: 1) physical proximity between the at least one slave node and at least one node joining or leaving the cluster as part of the reconfiguration, 2) a performance history of the at least one slave node and 3) receiving a directive from a user specifying to which at least one slave node to delegate reconfiguration functionality, and delegating reconfiguration functionality to the at least one slave node specified by the directive from the user; and
multiple nodes in the cluster performing reconfiguration functionality in parallel;
wherein the at least one slave node performs delegated reconfiguration tasks that would conventionally be performed by the master node.

12. The at least one non-transitory computer readable medium of claim 11 further storing program code for:
delegating reconfiguration functionality to at least one slave node located within a same physical site as at least one node joining or leaving the cluster as part of the reconfiguration.

13. The at least one non-transitory computer readable medium of claim 11 further storing program code for:
delegating reconfiguration functionality to at least one slave node running as a virtual machine on a same physical host as at least one node joining or leaving the cluster as part of the reconfiguration.

14. The at least one non-transitory computer readable medium of claim 11 further storing program code for:
determining which at least one slave node to delegate reconfiguration functionality to based at least in part on available hardware resources of the at least one slave node.

15. A computer system for distributing cluster reconfiguration among multiple nodes of a cluster, the computer system comprising:
a processor;
computer memory;
a reconfiguration initiation detecting module residing in the computer memory, for detecting an initiation of a reconfiguration of the cluster;
a delegating module residing in the computer memory, for delegating reconfiguration functionality from a master node in the cluster to at least one slave node in the cluster, such that multiple nodes in the cluster perform reconfiguration functionality in parallel, and for determining which at least one slave node to delegate reconfiguration functionality to based on at least one factor from a group of factors consisting of: 1) physical proximity between the at least one slave node and at least one node joining or leaving the cluster as part of the reconfiguration, 2) a performance history of the at least one slave node and 3) receiving a directive from a user specifying to which at least one slave node to delegate reconfiguration functionality, and delegating reconfiguration functionality to the at least one slave node specified by the directive from the user;
wherein the at least one slave node performs delegated reconfiguration tasks that would conventionally be performed by the master node.

16. The at least one non-transitory computer readable medium of claim 11 further storing program code for:
transmitting data to facilitate the cluster reconfiguration, from the master node to the at least one slave node, the data being present on the master node but not present on the at least one slave node.

17. The at least one non-transitory computer readable medium of claim 16 wherein the data to facilitate the cluster reconfiguration present on the master node but not present on the at least one slave node further comprises:
identifiers of at least one node joining or leaving the cluster as part of the reconfiguration.

18. The at least one non-transitory computer readable medium of claim 11 wherein the reconfiguration of the cluster further comprises:
at least one new node joining the cluster.

19. The at least one non-transitory computer readable medium of claim 18 further storing program code for:
transmitting information from the at least one slave node to the at least one new node joining the cluster concerning the architecture and shared storage media of the cluster.

20. The at least one non-transitory computer readable medium of claim 11 further storing program code for:
appointing one node of the cluster as the master node;
the master node joining a first slave node, and delegating a join of an additional slave node to the first joined slave node;

the master node and the first slave node each joining an additional slave node in parallel, and delegating a join of yet another slave node to each of the additional joined slave nodes; and cascading the delegation of subsequent join operations to additional joined slave nodes until all of the multiple nodes of the cluster are joined.

\* \* \* \* \*